United States Patent [19]

Reynolds

[11] 4,018,878
[45] Apr. 19, 1977

[54] PROCESS FOR PRODUCING CARBON BLACK
[75] Inventor: Richard H. Reynolds, Westerville, Ohio
[73] Assignee: Ashland Oil, Inc., Ashland, Ky.
[22] Filed: Dec. 29, 1975
[21] Appl. No.: 644,546
[52] U.S. Cl. .............................. 423/450; 23/259.5; 239/548; 423/445
[51] Int. Cl.² .......................................... C09C 1/50
[58] Field of Search .......... 423/450, 455, 456, 457; 23/259.5; 239/548, 554, 558

[56] References Cited
UNITED STATES PATENTS 3,003,854  10/1961  Heller ........................... 23/259.5 X
3,003,855  10/1961  Heller et al. ................... 23/259.5 X
3,100,689  8/1963   Mason ............................... 423/455
3,867,513  2/1975   Krejci ............................... 423/450

*Primary Examiner*—Edward J. Meros
*Attorney, Agent, or Firm*—William Kammerer

[57] ABSTRACT

The oil furnace process for the production of tread grade rubber reinforcing carbon black is modified in respect of the manner in which a carbon black producing feedstock oil is introduced into the cracking zone so as to facilitate the formation of carbon black of requisite structure characteristics having improved particle size distribution.

3 Claims, 3 Drawing Figures

U.S. Patent   April 19, 1977   4,018,878
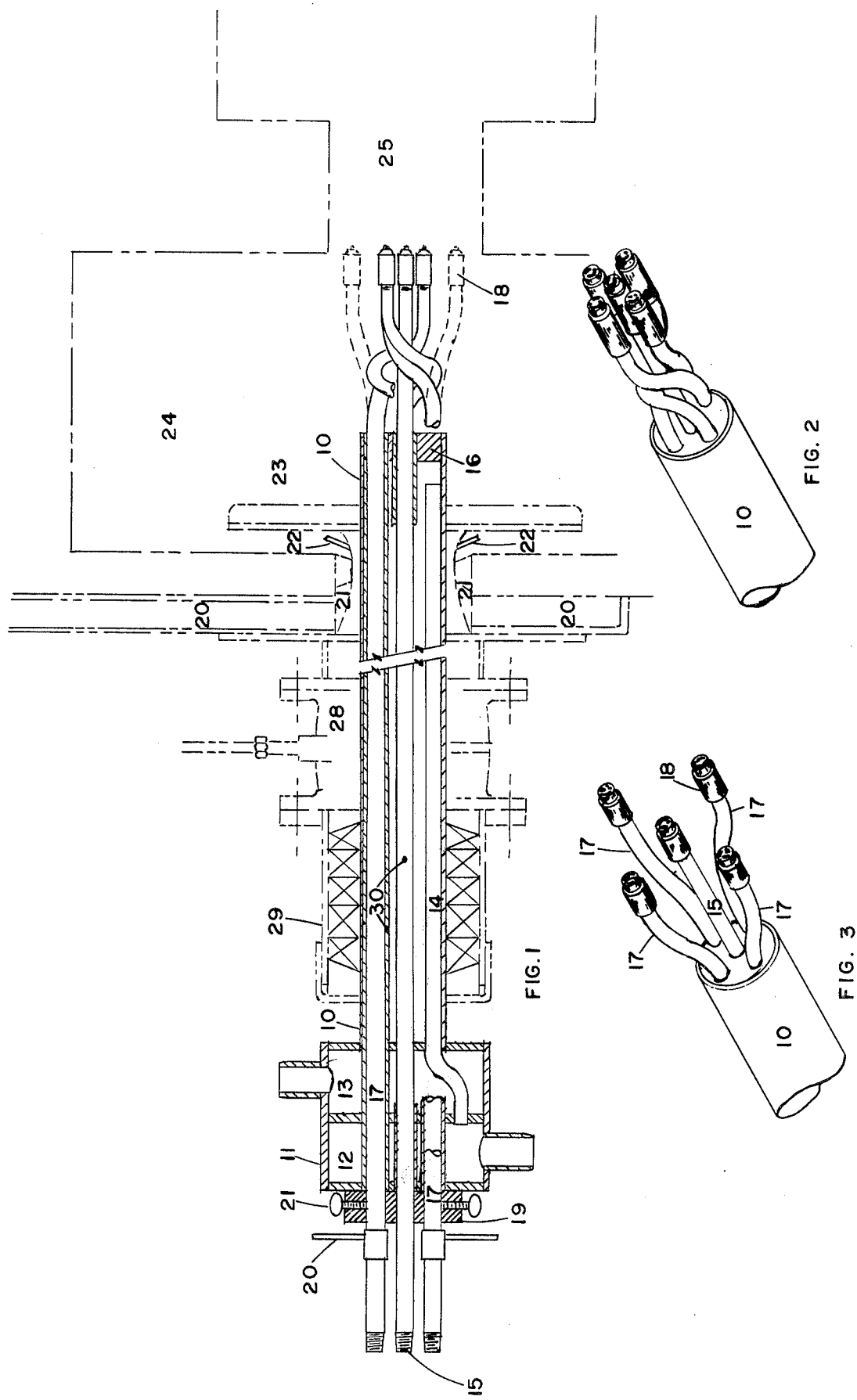

PROCESS FOR PRODUCING CARBON BLACK

BACKGROUND OF THE INVENTION

1. Field of the Invention

This invention relates to the furnace process for producing carbon black from a carbon producing feedstock oil and to a feedstock injection assembly useful in the practice thereof.

2. Description of the Prior Art

The oil furnace process for obtaining high abrasion resistant carbon blacks for rubber reinforcing applications, particularly automotive tires, known in the relevant industry as the HAF, ISAF and SAF types, basically consists of contacting atomized droplets of a normally liquid hydrocarbon feedstock with an extremely turbulent mass of combustion products resulting from burning a mixture of fuel gas and excess pre-heated air. In accordance with the foregoing method, a major portion of the feedstock is pyrolytically dissociated in a partial oxidation reaction to provide a substantial yield of carbon black in the form of an aerosol from whence pulverulent carbon black is recovered and then pelleted.

Beyond the particle size requirement of the respective grades of carbon black mentioned, there are other important quality standards that must be met, foremost of which is structure. Structure is essentially the inherent tendency of the nascent carbon black particles to agglomerate to form chain-like units of the particles during and immediately subsequent to the completion of the pyrolysis reaction. The structure characteristic is very important insofar as it relates directly to certain critical properties exhibited by cure, carbon black reinforced rubber compositions. It will suffice to say, however, that the carbon black manufacturing art as presently practiced is highly sophisticated and thus those skilled in this art are well aware of the combination of processing parameters needed to provide a quality product.

Lately, however, an additional quality standard for tread grade rubber reinforcing carbon black has been assuming importance. Such concerns the particle size distribution of the resultant product. Essentially the improvement being sought in this regard is to produce a product composed of more uniform particle sizes and particularly, the elimination of the larger particle size component associated with the heretofore standard products. In this connection, particle size refers to the size of the resultant agglomerates. These new products are referred to as high tint blacks, named so because of the empirical test method utilized to measure this property.

It is known in the art that the manner whereby the feedstock is injected into the furnace, specifically at or near the center of the situs of maximum turbulency of the cracking gases, leads to the formation of high tint black. However, this expedient results in a product having unacceptably low structure properties. In order to increase structure, the feedstock injector can be moved upstream of the high turbulence zone to provide for a broader feedstock spray pattern as it enters the high turbulence zone. This unfortunately reduces tint by increasing the agglomerate size distribution, so to compensate the reaction time must be shortened. This practice, however, reduces yield and calls for an expensive drying operation to rid the final product of unreacted oil so that the carbon black will meet the stain test imposed by the consuming rubber industry. It is, accordingly, the object of this invention to provide a modification of the oil furnace process for producing high tint carbon black without experiencing the shortcomings mentioned above.

SUMMARY OF THE INVENTION

In accordance with the present invention the oil furnace process for the production of carbon black is conducted in the manner facilitating the obtainment of standard tread grades of rubber reinforcing carbon black which otherwise exhibit improved particle size distribution. This is realized through a novel way of introducing the carbon black producing feedstock into the reaction or cracking zone of the furnace. Specifically in this regard, the normally liquid hydrocarbon feedstock is injected into the furnace as a multiple array of individual atomized sprays thereof directly into the upstream opening of the reaction zone where the flow rate and turbulency of the furnace effluent is maximized. The breadth of the spray pattern can be adjusted as required for structure control.

In a further aspect of the invention, a novel feedstock injection assembly is provided for effecting the introduction of the feedstock as aforesaid. The singular feature of the injection assembly resides in its compactness coupled with an ability to be mechanically operated from outside the furnace so as to control within designed limits the position of the individual spray elements.

BRIEF DESCRIPTION OF THE DRAWINGS

FIG. 1 is an elevational view, partly in section, illustrating an embodiment of a multiple spray feedstock injection assembly and its placement within a furnace design utilizing linear flow reaction conditions;

FIG. 2 is an isometric view of the downstream end of the injection assembly of FIG. 1 showing the individual spray elements in the retracted position; and FIG. 3 is a corresponding view of that of FIG. 2 showing the spray elements in an extended position.

DESCRIPTION OF THE PREFERRED EMBODIMENTS

In describing the process embodiment of this invention in detail it would be desirable to discuss generally but briefly the furnace design commonly utilized in the production of the abrasion resistant types of rubber reinforcing carbon blacks. While operational variants such as feedstock rate, air pre-heat temperature and rate, duration of the reaction, as well as the composition of the feedstock are important in implementing the production of abrasion resistant blacks, the design of the furnace nevertheless remains as the most important factor. By far, most of the commercial furnaces of the type under consideration are composed of two structural parts; the first or upstream portion being the combustion chamber wherein a mixture of a fuel, preferably natural gas, and an excess of combustion supporting gas, generally air, is combusted. The combustion chamber is invariably of tubular design having a diameter substantially larger than the length thereof. The other structural component of the furnace consists of the reaction zone wherein the carbon producing feedstock is for the most part dissociated into carbon black. This part of the furnace is in direct communication and centrally aligned with the downstream end of the combustion chamber. The reaction zone is likewise tubular but having a diameter substantially smaller than the length thereof. The reaction zone is provided with quench ports at various distances longitudinally removed from the upstream opening thereof whereby quench water can be introduced to terminate the cracking reaction after the desired duration.

Two modes of effluent flow are applicable in the operation of the aforedescribed furnace design. In one mode of operation the combustion air and fuel are introduced tangentially into the combustion chamber. The combusted gas accordingly enters into the reaction zone in an inwardly spiralling pattern and in so doing leads to the formation of extremely turbulent conditions therein especially near the upstream opening.

The other effluent flow pattern observed is that of axial flow whereby the combustion air and fuel are burned in the combustion chamber and introduced into the reaction zone is a generally linear manner. This type of flow does not create the highly turbulent conditions within the reaction zone as does the tangential flow method and therefore the upstream extremity of the reaction zone is provided with a choke or a venturi configuration in order to realize the degree of turbulency required.

The linear flow method of operation is preferred in the practice of this invention. A particularly suitable design for operating in the foregoing manner is the type of furnace shown in FIG. 1. Complete details with respect to this design of a furnace and the operation thereof can be found in U.S. Pat. No. 3,060,003.

With reference to FIG. 1 preheated combustion air is introduced into the plenum 20 and flows axially within conduit 21 to combine with the fuel gas provided by supply jets shown at 22. The flame and the resultant combustion products are directed radially outwardly by the deflector element 23. The hot combustion gases thereupon flow generally axially within the combustion chamber 24 near the peripheral extent thereof and then proceed radially downwardly along the downstream end of the combustion chamber and into the choke 25. Accordingly, the velocity as well as turbulency of the combustion gases are maximized in the choke section. The reactor effluent then flows into the enlarged reaction zone (not shown) and is quenched downstream by introducing sprays of water therein. In accordance with the present invention the individual feedstock injection means are positioned contiguous to and in axial alignment with the upstream opening of the choke, all shown in FIG. 1. Desirably, the injection assembly is designed so that the plurality of extendible spray means will, when fully extended, lie within and adjacent to the periphery of the choke opening. In this position the tint and structure of the resultant carbon black will be maximized. In the event less structure is desired, the outlying spray elements can be moved inwardly to the point which assures the degree of structure desired, without reducing tint.

As it is apparent from the foregoing discussion, the feedstock injector is positioned within the furnace where it is subjected to intense heat exposure, generally in the order of 2800° F. or more. Accordingly, it is essential that the unit be compact in order to minimize the area exposed to the high heat environment and to permit it to be removed from the furnace for periodic servicing without the necessity of shutting down the furnace. Compactness in itself will not serve to protect the injector for any extended period let alone maintain the feedstock below cracking temperature and therefore the unit must be internally cooled as a practical expedient. With the aforesaid requirements in mind, reference is again had to FIG. 1 for the purpose of illustrating a feedstock injection assembly useful in the practice of this invention.

The injector of FIG. 1 comprises an outer tubular member 10 serving as the cooling jacket. This portion of the unit extends centrally through the upstream extremity wall of the combustion chamber through packing gland 29 and gate valve 28, the latter being rigidly attached to the wall of the chamber thereby allowing removal of the injection assembly during operation without experiencing blowback. Tube 10 is preferably of heat resistant stainless steel and is appropriately connected at the upstream end thereof to a cooling water manifold shown generally at 11. Cooling water manifold 11 is composed of two sections. Inlet section shown at 12 is adapted for introducing the cooling water and outlet section shown at 13 is adapted for discharging same. The inlet section 12 of the manifold communicates directly with the interior of the cooling jacket 10 by means of quadrantly spaced tubes 14, which extend longitudinally to near the downstream extremity of the jacket thereby permitting the cooling water to discharge into the jacket at this location and to return and exit through outlet section 13 of the manifold.

Centrally positioned within the cooling water manifold/jacket combination is pipe 30 serving as a housing or conduit for feedstock supply tube 15. Feedstock supply tube 15 projects beyond the downstream extremity of the water jacket through spacer 16 which further serves as a closure means for this end of the jacket. Preferably, said projection of tube 15 threadedly engages with spacer/closure 16. Positioned about feedstock supply tube 15 within the manifold/jacket assembly are a plurality of parallelly disposed pipes 30 for housing feedstock supply tubes 17. Feedstock tubes 17 project through spacer/closure 16 via appropriately accommodating slip joints whereupon they are helically disposed about the corresponding projection of feedstock supply line 15. Each of the downstream terminal ends of the feedstock supply tubes 17 as well as tube 15 is provided with spray nozzle 18. The upstream ends of the feedstock supply lines project through the water cooling manifold via slip joints appropriately drilled in the stock member 19 welded to the inlet section 12 of the manifold. Lever arms 20 attached to feedstock supply lines 17 permit rotating said lines in order to obtain the desired radial extension of the feedstock spray nozzles. Each of feedstock supply lines 17 is provided with a set screw 21 to fix the position thereof and thus prevent further turning during operation of the furnace. Each of the feedstock supply lines 15 and 17 are individually adapted to be connected to a source of feedstock.

EXAMPLE I

In this example a furnace was used having a design corresponding to that shown in FIG. 1, and as previously mentioned, further details relative to the construction thereof not noted below can be found in U.S. Pat. No. 3,060,003. The combustion chamber measured about 3 feet in diameter and 15 inches in length. The choke section was 7 inches in diameter and 9 inches long. The reaction zone was 15 inches in diameter and the reaction was quenched therein approximately 12 feet downstream. A water cooled feedstock injection assembly corresponding identically to that depicted in FIG. 1 was utilized. The water jacket tube measured 2 inches in diameter and the five feedstock supply lines were constructed of ⅛ inch 310 stainless steel tubing each equipped with solid cone type spray nozzle. The rotatable supply lines defined a circle of 4 inch diameter when each was fully extended.

A 72-hour production run of HAF was conducted, in which the feedstock injection assembly was alternately maintained for approximately equal periods in the fully retracted and fully extended position. Other operational details included a fuel gas (natural) rate of 14,200 ft³/hr., air rate of 220,000 ft³/hr., air preheat temperature of 800° F. and a feedstock rate of 330 gallons/hr. The physical data observed for the carbon black produced in conducting this run are given in the following Table I.

TABLE I

| Sample | Spray Position | Surface Area (I₂ value) | Structure (DBP Absorb) | Part. Size Dist. (Tint) | Stain* |
|---|---|---|---|---|---|
| 1 | Extended | 96.5 | 147.5 | 111.6 | — |
| 2 | " | 108.0 | 149.0 | 106.9 | 72.7 |
| 3 | " | 93.8 | 145.6 | 106.9 | 59.0 |
| 4 | Retracted | — | 133.0 | 110.7 | 31.8 |
| 5 | " | 87.5 | 137.9 | 111.6 | 25.0 |

*Percent of standard light transmission

What is claimed is:

1. In the furnace process for the production of high tint, tread-grade rubber reinforcing carbon black wherein a fuel gas is essentially completely combusted in tubular chamber having a diameter substantially larger than length thereof and whereupon the resultant combustion gases enveloping a centrally confined spray of a normally liquid hydrocarbon feedstock are introduced into a tubular reaction zone to effect therein the thermal decomposition of the feedstock into carbon black under highly turbulent flow conditions, said tubular reaction zone being centrally aligned with said chamber and in open communication therewith and having a diameter substantially smaller than that of the chamber; the improvement comprising introducing a plurality of laterally disposed individual sprays of the feedstock into said reaction zone whereby the situs of injection are contiguous to said communicating opening of the reaction zone.

2. The improvement in accordance with Claim 1 wherein the combustion gases are introduced into said reaction zone in a generally linear flow pattern.

3. The improvement in accordance with claim 2 wherein the laterally disposed feedstock sprays include a centrally positioned spray in relation to the reaction zone opening and a plurality of sprays radially removed therefrom and positioned within the periphery of said opening.

* * * * *